US012587525B2

(12) United States Patent
Singh et al.

(10) Patent No.: US 12,587,525 B2
(45) Date of Patent: Mar. 24, 2026

(54) ALTERING CARD DEVICE ATTRIBUTES IN RESPONSE TO DETECTING AN ANOMALOUS LOCATION OF THE CARD DEVICE

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/188,877

(22) Filed: Mar. 23, 2023

(65) Prior Publication Data

US 2024/0323181 A1 Sep. 26, 2024

(51) Int. Cl.
*H04L 9/40* (2022.01)
*G06T 7/73* (2017.01)

(52) U.S. Cl.
CPC ............ *H04L 63/0853* (2013.01); *G06T 7/74* (2017.01)

(58) Field of Classification Search
CPC ... H04L 63/0853; G06T 7/74; G06Q 20/3224; G06Q 20/341; G06Q 20/354; G06Q 20/4014; G06Q 20/40145; G06Q 20/4015; G06V 40/10; G06F 2221/2111; G06F 21/554
See application file for complete search history.

(56) References Cited

U.S. PATENT DOCUMENTS

| | | | |
|---|---|---|---|
| 7,805,377 B2 | 9/2010 | Felsher | |
| 7,813,822 B1 | 10/2010 | Hoffberg | |
| 7,916,354 B2 | 3/2011 | Rhoads | |
| 8,027,520 B2 | 9/2011 | Rhoads | |
| 8,324,018 B2 | 12/2012 | Isa et al. | |
| 8,370,362 B2 | 2/2013 | Szabo | |
| 8,468,244 B2 | 6/2013 | Redlich et al. | |
| 8,566,115 B2 | 10/2013 | Moore | |
| 8,850,507 B2 | 9/2014 | Reisman | |

(Continued)

OTHER PUBLICATIONS

Singh, Shailendra, "Altering card device attributes in response to detecting a proximity intrusion," U.S. Appl. No. 18/188,898, filed Mar. 23, 2023 (46 pages).

(Continued)

*Primary Examiner* — Catherine Thiaw
*Assistant Examiner* — Nega Woldemariam

(57) ABSTRACT

A card device receives a first sensor data from sensors associated with the card device and extracts a set of user features from the first sensor data, where the user features indicate physical attributes of the user. The card device receives a second sensor data from the sensors. The card device extracts a set of viewer features from the second sensor data, where the viewer features indicate physical attributes of the viewer. The card device compares at least one of the user features with a counterpart feature from among the viewer features. The card device determines that the user is not the viewer. The card device determines a distance between the viewer and the card device. The card device determines that the distance between the viewer and the card device is less than a threshold distance. In response, the card device dynamically masks the information displayed on the card device.

20 Claims, 5 Drawing Sheets

(56) References Cited

U.S. PATENT DOCUMENTS

| | | | |
|---|---|---|---|
| 8,904,181 | B1 | 12/2014 | Felsher et al. |
| 9,311,670 | B2 | 4/2016 | Hoffberg |
| 9,356,152 | B2 | 5/2016 | Isa et al. |
| 9,361,481 | B2 | 6/2016 | Lafever et al. |
| 9,898,730 | B2 | 2/2018 | Flitcroft et al. |
| 10,043,035 | B2 | 8/2018 | Lafever et al. |
| 10,059,265 | B2 | 8/2018 | Schofield et al. |
| 10,291,657 | B2 | 5/2019 | Narayanaswamy et al. |
| 10,872,333 | B2 | 12/2020 | Dua |
| 11,546,433 | B2 | 1/2023 | Levi et al. |
| 2009/0048978 | A1 | 2/2009 | Ginter et al. |
| 2014/0067679 | A1* | 3/2014 | O'Reilly .......... G06Q 20/40145 |
| | | | 705/44 |
| 2019/0080153 | A1* | 3/2019 | Kalscheur ............... G06F 16/56 |
| 2019/0114643 | A1* | 4/2019 | Dewitt ............... G06Q 20/3226 |
| 2020/0042685 | A1* | 2/2020 | Tussy ..................... G06V 40/50 |
| 2020/0410314 | A1* | 12/2020 | Stahlhut ................ G07F 7/0833 |
| 2021/0124479 | A1* | 4/2021 | Atieh ...................... G06F 21/31 |
| 2021/0141888 | A1* | 5/2021 | Hires ................... H04L 9/3231 |
| 2021/0173916 | A1* | 6/2021 | Ortiz ..................... H04L 9/3231 |
| 2021/0374275 | A1* | 12/2021 | Singh ................... G06F 16/538 |
| 2022/0021516 | A1* | 1/2022 | Kurian .................. H04L 9/0894 |
| 2022/0114808 | A1* | 4/2022 | Gupta .................. G06V 40/161 |
| 2022/0138768 | A1* | 5/2022 | Zhai ................... G06Q 30/0185 |
| | | | 705/44 |
| 2024/0202727 | A1* | 6/2024 | Benkley, III .......... H04L 9/3231 |
| 2024/0291863 | A1* | 8/2024 | Cohen ................. H04L 63/1425 |
| 2024/0321003 | A1* | 9/2024 | Singh ................. H04L 63/0853 |
| 2024/0323181 | A1* | 9/2024 | Singh ................. G06Q 20/4015 |
| 2024/0323182 | A1* | 9/2024 | Koshy ............... G06K 19/0723 |

OTHER PUBLICATIONS

Prime Faraday Partnership, Technology Watch, "An Introduction to MEMS (Micro-electromechanical Systems)" ISBN 1-84402-020-7, Jan. 2002.

Nano Nano Werk Werk, Gartner's Data Center Vision, "What is smart dust and how it is used?" https://www.nanowerk.com/smartdust.php.

GOVS, Smart Dust—Microelectromechanical systems (MEMS), May 9, 2019. https://www.gavstech.com/smart-dust-microelectromechanical-systems-mems/.

* cited by examiner

ALTERING CARD DEVICE ATTRIBUTES IN RESPONSE TO DETECTING AN ANOMALOUS LOCATION OF THE CARD DEVICE

TECHNICAL FIELD

The present disclosure relates generally to information security, and more specifically to altering card device attributes in response to detecting a proximity intrusion.

BACKGROUND

Cards display confidential information of the users. In some cases, the cards may be misplaced or stolen. In some cases, other people may be close to a card and be able to glance at the confidential information displayed on the card. While performing daily activities, the users are prone to scenarios where unauthorized viewers can view the confidential information displayed on the cards. It is challenging to protect confidential information displayed on the cards from unauthorized viewers. The existing systems lack capabilities to mask confidential information from unauthorized viewers in such scenarios.

SUMMARY

The system described in the present disclosure is particularly integrated into practical applications of improving the information security technology by masking information displayed on the card device and/or disabling data communications for the card device in response to detecting an anomaly with respect to the card device. Examples of the anomaly may include a case where the card device is in an area that deviated from a baseline environment data profile associated with the user associated with the card device, a case where one or more unauthorized people or viewers are within a threshold proximity or distance from the card device, and the like. Certain technical advantages are provided by the embodiments of the present disclosure.

In some cases, the card device may be misplaced or stolen. In some cases, some people may be close to the card device while the user is carrying the card device, and the people may be able to view the user information on the card device. The user information may include sensitive or private information associated with the user.

Therefore, the disclosed system provides a solution to these and other technical problems by implementing an unconventional system and method configured to detect situations where the card device is misplaced or stolen, and cases where unauthorized people are within a threshold distance from the card device and can view the information displayed on the card device. To protect the user information from unauthorized access, the card device is configured to detect such cases and, in response, mask the user information and/or disable the data communications for the card device. For example, masking the user information may include replacing the text indicating the user information with other characters, e.g., "x". In response to disabling the data communications for the card device the information stored in the memory of the card device cannot be accessed or communicated to another device. Therefore, the user information and other information stored in the memory of the card device are protected from unauthorized access and the card device cannot be used to perform actions, e.g., communicate data to and/or from another device. In this manner, the system is integrated into a practical application of detecting anomalies with respect to the card device and, in response, protecting the information stored by the card device, and disabling the data communications for the card device.

In this way, the disclosed system improves the data security technology and the security of the card device and information stored in a memory of the card device. Therefore, the disclosed system minimizes (or prevents) unauthorized access to non-public information associated with the users. This leads to securing non-public information from unauthorized access by bad actors.

Altering Card Device Attributes in Response to Detecting an Anomalous Location of the Card Device In certain embodiments, a system for dynamically changing attributes of the card device comprises at least one sensor, a display field, and a processor. The at least one sensor is configured to capture sensor data, wherein the sensor data provides information about an environment around a card device. The display field is configured to display information associated with a first user. The processor is operably coupled to the at least one sensor and the display field. The processor is configured to receive a first sensor data from the at least one sensor. The processor is further configured to generate a baseline environment data profile for the first user based at least in part upon the first sensor data, wherein the baseline environment data profile indicates a geographical location where the first user typically carries the card device. The processor is further configured to receive a second sensor data from the at least one sensor. In response to receiving the second sensor data, the processor is further configured to extract baseline features from the first sensor data, wherein the baseline features provide information about the baseline environment data profile. The processor is further configured to extract test features from the second sensor data. The processor is further configured to compare at least one of the extracted baseline features with a counterpart feature from among the extracted test features. The processor is further configured to determine that the card device is in an area that deviates from the geographical location where the card device is typically carried in response to determining that the at least one of the extracted baseline features does not correspond to the counterpart feature from among the extracted test features. The processor is further configured to dynamically mask the information displayed on the display field in response to determining that the card device is in the area that deviates from the geographical location.

Altering Card Device Attributes in Response to Detecting Proximity Intrusion

In certain embodiments, a system for dynamically changing attributes of the card device comprises at least one sensor, a display field, and a processor. The at least one sensor is configured to capture sensor data, wherein the sensor data provides information about an environment around a card device. The display field is configured to display information associated with a first user. The processor is operably coupled to the at least one sensor and the display field. The processor is configured to receive a first sensor data from the at least one sensor, wherein the first sensor data indicates presence of the first user around the card device. The processor is further configured to extract a set of user features from the first sensor data, wherein the set of user features indicate physical attributes of the first user. The processor is further configured to receive a second sensor data from the at least one sensor, wherein the second sensor data indicates presence of a viewer around the card device. The processor is further configured to extract a set of viewer features from the second sensor data, wherein the set of viewer features indicate physical attributes of the viewer. The processor is further configured to compare at least one of the user features with a counterpart feature from among the set of viewer features. The processor is further configured to determine that the more than a threshold percentage of the set of user features does not correspond to counterpart features from among the set of viewer features. The processor is further configured to determine that the viewer is not the first user in response to determining that more than the threshold percentage of the set of baseline features does not correspond to the counterpart features from among the set of viewer features. The processor is further configured to determine a distance between the viewer and the card device. The processor is further configured to compare the determined distance with a threshold distance. The processor is further configured to determine that the determined distance is less than the threshold distance. The processor is further configured to dynamically mask the information displayed on the display field in response to determining that the determined distance is less than the threshold distance and that the viewer is not the first user.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect anomalies with respect to a card device. Embodiments of the present disclosure and its advantages may be understood by referring to FIGS. 1 through 5. FIGS. 1 through 5 are used to describe systems and methods to alter card device attributes in response to an anomaly according to certain embodiments.

System Overview

Figure 1:
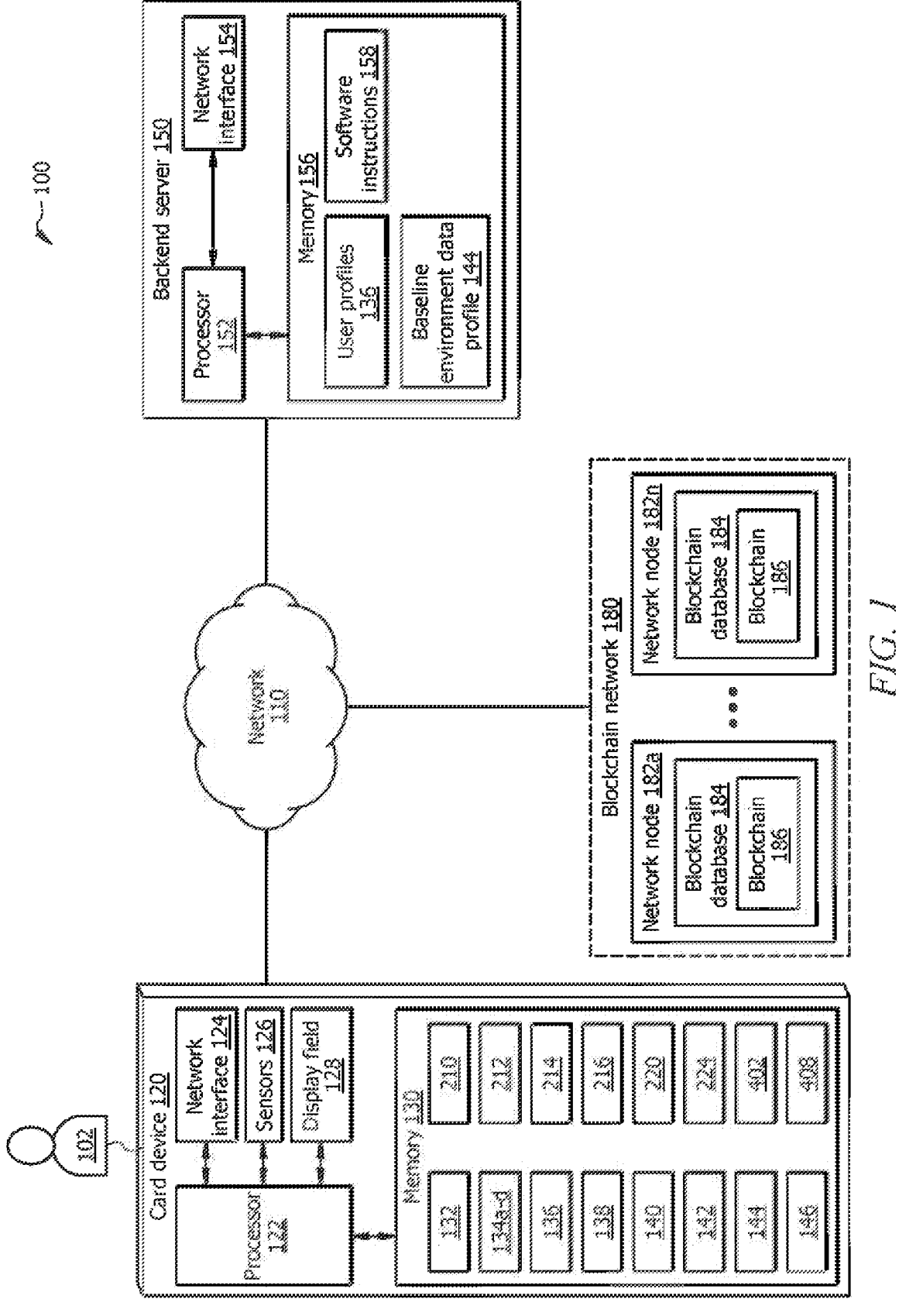
FIG. 1 illustrates an embodiment of a system configured to alter card device attributes in response to an anomaly.

FIG. 1 illustrates an embodiment of a system 100 that is generally configured to alter attributes of a card device 120 in response to detecting an anomaly with respect to the card device 120, where the anomaly may include a case where an unauthorized person is within a threshold distance from the card device 120 and can identity the information displayed on the card device 120 and a case where the card device 120 is in an area/location that deviates from the known locations where the card device 120 is typically carried. In certain embodiments, the system 100 comprises the card device 120 communicatively couples to a backend server 150 and a blockchain network 180 via a network 110. Network 110 enables the communications of the components of the system 100. The card device 120 includes a processor 122 in signal communication with a memory 130. The memory 130 stores software instructions 132 that when executed by the processor 122 cause the processor 122 to perform one or more operations described herein. The backend server 150 includes a processor 152 in signal communication with a memory 156. Memory 156 stores software instructions 158 that when executed by the processor 152 cause the processor 152 to perform one or more operations described herein. In other embodiments, system 100 may not have all of the components listed and/or may have other elements instead of, or in addition to, those listed above.

In general, the system 100 improves information security technology by masking information 138 displayed on the card device 120 and/or disabling data communications for the card device 120 in response to detecting an anomaly with respect to the card device 120. Examples of the anomaly may include a case where the card device 120 is in an area that deviated from a baseline environment data profile 144 associated with the user 102 associated with the card device 120, a case where one or more unauthorized people or viewers are within a threshold proximity or distance 140 from the card device 120, and the like. The operation by which the card device 120 may alter the attributes of the card device 120 in response to detecting an anomalous location of the card device 120 is described in FIGS. 2-3. The operation by which the card device 120 may alter the attributes of the card device 120 in response to detecting a proximity intrusion of a viewer is described in FIGS. 4-5.

In some cases, the card device 120 may be misplaced or stolen. In some cases, some people may be close to the card device 120 while the user 102 is carrying the card device 120, and the people may be able to view the user information 138 on the card device 120. The user information 138 may include sensitive or private information associated with the user 102. To protect the user information 138 from unauthorized access, the card device 120 is configured to detect such cases and, in response, mask the user information 138 and/or disable the data communications for the card device 120. For example, masking the user information 138 may include replacing the text indicating the user information 138 with other characters, e.g., "x". In response to disabling the data communications for the card device 120, the information stored in the memory 130 of the card device 120 cannot be accessed or communicated to another device. Therefore, the user information 138 and other information stored in the memory 130 of the card device 120 are protected from unauthorized access and the card device 120 cannot be used to perform actions, e.g., communicate data to and/or from another device. In this manner, the system 100 is integrated into a practical application of detecting anomalies with respect to the card device 120 and, in response, protecting the information stored by the card device 120, and disabling the data communications for the card device 120. Therefore, system 100 provides a solution to technical problems of card devices 120 being misplaced or stolen, and unauthorized people being within a threshold distance 140 from the card device 120.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Card Device

A card device 120 is a portable card device that is generally configured to process data and interact with users. Examples of the card device 120 include a personal card, etc. In the illustrated embodiment, the card device 120 includes a processor 122 in signal communication with a network interface 124, sensors 126, a display field 128, and a memory 130. In certain embodiments, the card device 120 may be configured as shown or other configurations.

Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 132) to perform the operations of the card device 120 described herein. In this way, processor 122 may be a special-purpose computer designed to implement the functions disclosed herein. In an embodiment, the processor 122 is implemented using logic units, FPGAS, ASICS, DSPs, or any other suitable hardware. The processor 122 is configured to operate as described in FIGS. 1-5. For example, the processor 122 may be configured to perform one or more operations of the operational flow 200 as described in FIG. 2, one or more operations of method 300 as described in FIG. 3, perform one or more operations of the operational flow 400 as described in FIG. 4, and one or more operations of method 500 as described in FIG. 4.

Network interface 124 is configured to enable wired and/or wireless communications. The network interface 124 may be configured to communicate data between the card device 120 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

Sensors 126 may include any type of sensor, including one or more cameras, sound sensors, light sensors, humidity sensors, biometric sensors, pressure sensors, motion sensors, a global positioning system (GPS) sensor, and one or more microelectromechanical system (MEMS) sensors, among others. Each sensor 126 may be configured to detect respective sensor data 134. For example, the cameras may be configured to capture images and/or videos, the sound sensors may be configured to capture audio signals, the light sensors may be configured to detect light brightness levels, the humidity sensors may be configured to detect humidity levels, the biometric sensors may be configured to detect biometric features (e.g., fingerprint, etc.), the pressure sensors may be configured to detect air pressure, e.g., with respect to the sea level, the motion sensors may be configured to detect movements of the objects, the GPS sensor may be configured to detect the location coordinate of the card device 120, and the MEMS sensors may be configured to detect any attribute with respect to their surroundings.

The sensor data 134 may include an image feed, a video feed, an audio feed, a light data feed (that indicates the light brightness levels), a humidity data feed (that indicates the humidity levels), a biometric data feed (that indicates the biometric features), a pressure data feed (that indicates the pressure levels), a motion data feed (that indicates movements of objects), a location data feed, and any other type of data feed. The sensor data 134 may provide information about the environment surrounding the card device 120 (e.g., within a detection range or field of view of the sensors 126). For example, the sensor data 134 may provide information about objects around the card device 120, such as shapes, colors, locations, etc.

Display field 128 may be a display portion of the card device 120 and is generally configured to display user information 138. The display field 128 may include a liquid crystal display (LCD), a light emitting diode (LED) display, and the like. For example, the display field 128 may display a name, a number, an address, etc. associated with the user 102.

Memory 130 may be volatile or non-volatile and may comprise read-only memory (ROM), random-access memory (RAM), ternary content-addressable memory (TCAM), dynamic random-access memory (DRAM), and static random-access memory (SRAM). The memory 130 may include one or more of a local database, a cloud database, a network-attached storage (NAS), etc. The memory 130 comprises one or more disks, tape drives, or solid-state drives, and may be used as an over-flow data storage device, to store programs when such programs are selected for execution, and to store instructions and data that are read during program execution. The memory 130 may store any of the information described in FIGS. 1-5 along with any other data, instructions, logic, rules, or code operable to implement the function(s) described herein when executed by processor 122. For example, the memory 130 may store software instructions 132, user profile 136, user information 138, test features 212, baseline features 210, user features 404, viewer features 408, sensor data 134a-d, baseline environment data profile 144, interaction session data 146, machine learning algorithm 142, threshold distance 140, pose estimation data 220, 224, messages 214, 216, and/or any other data or instructions. The software instructions 132 may comprise any suitable set of instructions, logic, rules, or code operable to execute the processor 122 and perform the functions described herein, such as some or all of those described in FIGS. 1-5.

Machine learning algorithm 142 may be implemented by the processor 122 executing software instructions 132, and is generally configured to generate the baseline environment data profile 144 and other environment data based on the sensor data 134, determine an identity of the user 102 based on biometric data associated with the user 102, such as image feed, audio feed, pose estimation, etc., determine whether the card device 120 is misplaced or stolen, among one or more other operations described herein.

In certain embodiments, the machine learning algorithm 142 may include a support vector machine, neural network, random forest, k-means clustering, Tree-based algorithm, Random Forest algorithm, etc. In certain embodiments, the machine learning algorithm 142 may include image processing, object detection, object recognition, video processing algorithms, biometric feature processing, and the like.

The machine learning algorithm 142 may be implemented by supervised, semi-supervised, or unsupervised training algorithms. In a training stage, the machine learning algorithm 142 may be given a training dataset comprising a set of sample data (e.g., an image, an audio, a video, a biometric sample, etc.) each labeled with a respective label data. For example, the machine learning algorithm 142 may be given a set of images of the user 102 and a label data indicating the identity of the user 102. The machine learning algorithm 142 may extract a set of features from the sample data and associated the features with the label data. In this process, the machine learning algorithm 142 may learn the correlation between each sample data and the respective label data. In the testing stage, the machine learning algorithm 142 may be given a test data (e.g., an image, an audio, a video, a biometric sample, etc.) that is not labeled with a label data, and is asked to predict the label data associated with the test data. The machine learning algorithm 142 may extract a set of features from the test data and compare the extracted features with the training dataset. The machine learning algorithm 142 may determine to which sample data the test data corresponds to based on the comparison. In response to finding a matching or corresponding features from the training dataset, the machine learning algorithm 142 may determine that the test data is associated with a particular label data associated with the sample data with the matching or corresponding features. In a refining and backpropagation, the machine learning algorithm 142 may update the weight and bias values of the neural networks to increase the accuracy of the prediction of the machine learning algorithm 142.

The baseline environment data profile 144 comprises data about one or more geographical locations where the user 102 carries the card device 120. For example, the baseline environment data profile 144 may include sensor data 134 associated with the one or more geographical locations where the user 102 carries the card device 120. For example, the baseline environment data profile 144 may include an image feed, an audio feed, a humidity data, pressure data (e.g., air pressure with respect to the seal level), light data, GPS location coordinate data, and motion data captured by the camera, a sound sensor, a humidity sensor, a pressure sensor, a light sensor, a GPS sensor, a motion sensor associated with the one or more geographical location, respectively.

The data about the user 102 may be determined by the machine learning algorithm 142 from the sensor data 134, including an image of the user 102, an audio signal associated with the user 102, etc. The user profile 136 may include the user information 138 associated with the user 102. The user information 138 may include information associated with the user 102 and displayed on the display field 128. For example, the user information 138 may include a name, an address, a number, a security code a calendar date, an expiration date, etc. associated with the user 102. The user features 404 may comprise data about the user 102, such as facial features, audio features, biometric features, pose estimation, etc. The viewer features 408 may comprise data about the viewer (402 in FIG. 4), such as facial features, audio features, biometric features, pose estimation, etc. The viewer features 408 and the user features 404 may be determined by the machine learning algorithm 142. These operations are described in greater detail in FIGS. 2-5.

Backend Server

Backend server 150 generally includes a hardware computer system configured to store the user profiles 136 and corresponding baseline environment data profile 144. In certain embodiments, the backend server 150 may be implemented by a cluster of computing devices, such as virtual machines. For example, the backend server 150 may be implemented by a plurality of computing devices using distributed computing and/or cloud computing systems in a network. In certain embodiments, the backend server 150 may be configured to provide services and resources to other components and devices.

The backend server 150 comprises a processor 152 operably coupled with a network interface 154 and a memory 156. Processor 152 comprises one or more processors. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 158) to perform the operations of the backend server 150 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-5. For example, the processor 152 may be configured to perform one or more operations of the operational flow 200 as described in FIG. 2, one or more operations of method 300 as described in FIG. 3, perform one or more operations of the operational flow 400 as described in FIG. 4, and one or more operations of method 500 as described in FIG. 4.

Network interface 154 is configured to enable wired and/or wireless communications. The network interface 154 may be configured to communicate data between the backend server 150 and other devices, systems, or domains. For example, the network interface 154 may comprise an NPC interface, a Bluetooth interface, a Zigbee interface, a Z-wave interface, an RFID interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be volatile or non-volatile and may comprise ROM, RAM, TCAM, DRAM, and SRAM. The memory 156 may include one or more of a local database, a cloud database, a NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-5 along with any other data, instructions, logic, rules, or code operable to implement the function(s) described herein when executed by processor 152. For example, the memory 156 may store software instructions 158, user profiles 136, baseline environment data profiles 144, and/or any other data or instructions. The software instructions 158 may comprise any suitable set of instructions, logic, rules, or code operable to execute the processor 152 and perform the functions described herein, such as some or all of those described in FIGS. 1-5.
Blockchain Network Blockchain network 180 is a peer-to-peer network of network nodes, and is generally configured to distribute interaction session data 146 (and any other data/information) among the network nodes 182*a-n*. In certain embodiments, the blockchain network 180 is a distributed database in a network of network nodes 182*a-n*. In certain embodiments, blockchain network 180 may be a public blockchain network. In certain embodiments, blockchain network 180 may be a private blockchain network. For example, membership in blockchain network 180 may be limited to nodes registered as belonging to and/or affiliated with the organization to which the backend server 150 and/or the card device 120 belongs. In certain embodiments, the backend server 150 may be a member of blockchain network 180 (e.g., as nodes among nodes 182*a-n* in blockchain network 180).

The blockchain network 180 may comprise any number of network nodes 182*a-n* to form a distributed network that maintains a blockchain 186. Each network node 182 may comprise a computing device, a virtual machine, a server, a workstation, and/or the like. Each network node 182*a* through 192*n* of blockchain network 180 stores a blockchain database 184 that is configured to store a copy of a blockchain 186. Each network node 182*a* through 192*n* may be an instance of a network node 182. The network node 182 may include a hardware processor, memory, and/or circuitry (not explicitly shown) configured to perform any of the functions or actions of the network node 182 described herein. For example, a software application designed using software code may be stored in the memory and executed by the processor to perform the functions of the network node 182. The network node 182 is configured to communicate with other devices and components of the system 100 via the network 110.

In certain embodiments, the backend server 150 may access the blockchain network 180 via the network 110 to distribute information in the blockchain network 180, including the interaction session data 146. The blockchain network 180 may be configured to distribute interaction session data 146 among the nodes. The backend server 150 may use an application programming interface (API) service via the network 110 to access the blockchain network 180.

Figure 3:
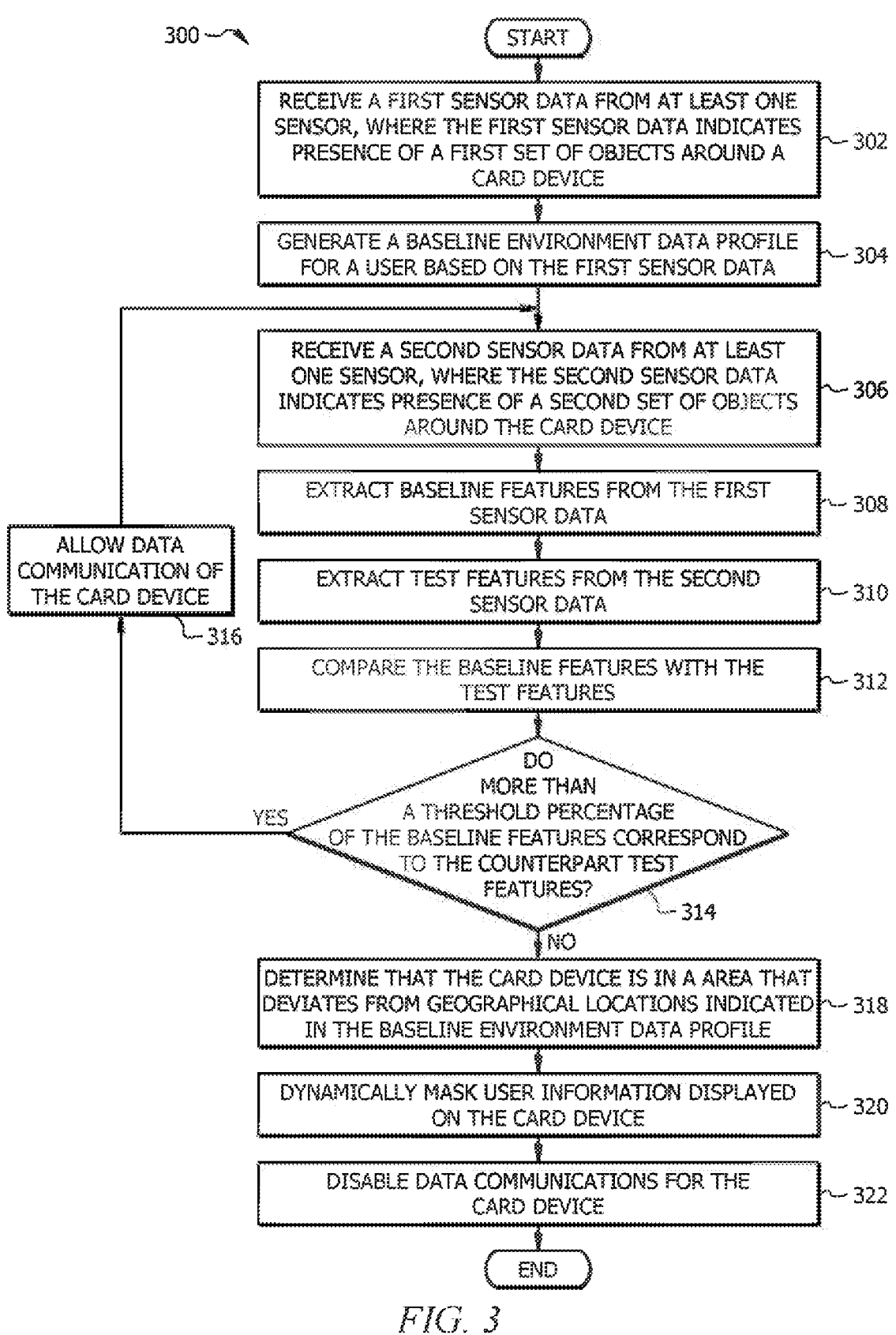
FIG. 3 illustrates an example flowchart of a method for altering card device attributes in response to an anomalous location of the card device.

The blockchain network 180 is configured to establish consensus among the network nodes 182*a-n* about the present state of the blockchain database 184. For example, each network node 182*a-n* comprises a processor in signal communication with a memory storing software instructions that when executed by the processor, cause the network nodes 182*a-n* to implement a consensus protocol procedure through which all the network nodes 182*a-n* of the blockchain network 180 reach a common agreement about the present state of the blockchain database 184. In this way, each network node 182*a-n* achieves reliability in the blockchain network 180 and establishes trust between the network nodes 182*a-n* in a distributed computing environment. Essentially, the consensus protocol makes sure that every new block that is added to the blockchain 186 is the one and only version of the truth that is agreed upon by all the block in the blockchain 186. Blockchain 186 links together blocks of data, which store identifiable units called blockchain data entries. The blockchain data entry may be interchangeably referred to herein as a blockchain data entry. The blockchain data entries stored in the blockchain 186, may include information, files, and/or any other suitable type of data. For example, blockchain data entries may include interaction session data 146 received from the backend server 150. Each interaction session data 146 may be associated with a different interaction session. The interaction session data 146 may include information about a sending entity (e.g., the card device 120 or another device), information about a receiving entity (e.g., the card device 120 or another device), authentication token, data transferred (e.g., software and/or hardware services), a timestamp of each data transfer, and/or any other information, for example. With every new data transfer (e.g., every new interaction session), a new block of data may be generated and added to the blockchain 186.
Operational Flow for Altering Attributes of the Card Device in Response to Detecting an Anomalous Location of the Card Device FIG. 3 illustrates an example operational flow 200 of the system 100 of FIG. 1 for altering attributes of the card device 120 in response to detecting anomalous location of the card device 120 according to one or more embodiments. In operation, the operational flow 200 may begin when the card device 120 generates the baseline environment data profile 144.
Generating the Baseline Environment Data Profile For example, assume that the user 102 registers at an organization and obtains the card device 120. Upon registering and obtaining the card device 120, the user 102 may authenticate themselves to the card device 120. For example, the user 102 may setup credentials with the card device 120, e.g., by connecting the card device 120 to a computer system and setting up the credentials via an interface application associated with the card device 120. In another example, the user 102 may setup the credentials with the card device 120 via the sensors 126, e.g., by providing fingerprints. In another example, the card device 120 may be paired with the user 102 by capturing an image of the user 102 (by a camera sensor 126), extracting facial features of the user 102 (e.g., via the machine learning algorithm 142), and associating the facial features of the user 102 to the card device 120. In other examples, any attribute associated with the user 102 may be used to pair the user 102 to the card device 120, such as an audio sample, pose estimation, retinal feature, etc.

The card device 120 is to be trained to understand the geographical locations where the user 102 typically carries the card device 120. For example, the geographical locations where the user 102 typically carries the card device 120 may include the house, office, vehicle, a pathway where the user 102 walks in the streets, among others. To this end, in the training phase, the sensors 126 may detect the presence of objects 202 around the card device 120. The card device 120 may receive first sensor data 134a from the sensors 126, where the first sensor data 134a may indicate presence of first set of objects 202 around the card device 120 within a detection range of the sensors 126. This process may be performed at one or more locations where the user 102 wants the card device 120 to be trained to learn the environment, such as inside the house of the user 102, inside the vehicle of the user 102, inside the office of the user 102, etc. For example, the sensors 126 may detect the presence of the user 102, objects inside the house of the user 102, objects inside the vehicle of the user 102, objects inside the office of the user 102, etc.

The first sensor data 134a is fed to the machine learning algorithm 142. The machine learning algorithm 142 may process the first sensor data 134a and generate the baseline environment data profile 144 based on the sensor data 134a. The baseline environment data profile 144 may indicate geographical location(s) where the user 102 typically carries the card device 120, such as the house, vehicle, particular pathways where the user 102 walks, office, etc.

In certain embodiments, the machine learning algorithm 142 may generate the baseline environment data profile 144 in response to extracting a set of baseline features 210 from the sensor data 134a and associating that baseline features 210 to the user 102. For example, the baseline features 210 may provide information about the baseline environment data profile 144 (e.g., the geographical location(s) where the user 102 typically carries the card device 120). In other words, the baseline features 210 may provide information about objects 202 detected by the sensors 126 when the card device 120 is in geographical location(s) where the user 102 typically carries the card device 120. The baseline features 210 may indicate physical attributes of the objects 202, such as shapes, colors, and locations. In response, the card device 120 may be trained to understand that the user 102 typically carries the card device 120 in the geographical location(s) indicated in the baseline environment data profile 144. The card device 120 may perform similar operations for each location that the user 102 carries the card device 120, e.g., the house, vehicle, office, pathways where the user 102 walks, etc. For example, when the user 102 carries the card device 120 to their house, the card device 120 may prompt the user 102 to authenticate themselves, e.g., by providing a biometric sample, via an image of the user, etc. by providing a user credential, e.g., username password, a security code sent to a mobile device associated with the user 102, among others.

In response to the user 102 being authenticated, the sensors 126 capture sensor data 134a and communicate the sensor data 134a to the processor of the card device 120. The card device 120 processes the sensor data 134a, detects the objects 202 inside the house of the user 102, associate the house of the user 102 to the user 102, and includes the house of the user 102 in the baseline environment data profile 144 for the user 102. The card device 120 may perform similar operations for other locations where the user 102 carries the card device 120 and authenticate themselves to the card device 120, similar to that described above. In this manner, the card device 120 is trained to identify and understand the environments or locations where the user 102 typically carries the card device 120 and include those in the baseline environment data profile 144.

In certain embodiments, if a new environment is detected, the card device 120 may prompt the user 102 to authenticate themselves, e.g., by displaying an authentication request on the display field. If the user 102 is authenticated by the card device 120, the card device 120 may perform similar operations to understand and identify the new environment based on the objects in the new environment and add the new environment to the baseline environment data profile 144.

In certain embodiments, the card device 120 may disregard (and delete) a geographical location from the baseline environment data profile 144 if it is determined that the user 102 has not carried the card device 120 in the geographical location for more than a threshold period, e.g., more than five months, three months, etc. For example, the card device 120 may keep the most recent geographical locations that the user 102 carried the card device 120 within past five months, three months, etc. in the baseline environment data profile 144. In this manner, whenever the card device 120 is carried to one of the known geographical locations indicated in the baseline environment data profile 144, the card device 120 may recognize that it is one of the known locations, and not an anomalous (e.g., unfamiliar) location.

Evaluating a New Environment Against the Baseline Environment Data Profile

The card device 120 may determine if a new environment (that the card device 120 is located) corresponds to one of the known geographical locations included in the baseline environment data profile 144. For example, assume that the card device 120 is carried to a new location. The sensors 126 may capture second sensor data 134b, where the second sensor data 134b may indicate presence of a second set of objects 204 around the card device 120. For example, the second set of objects 204 may include objects in the new location. The sensor data 134b may indicate locations, shapes, and colors of the second set of objects 204.

The card device 120 may receive the second sensor data 134b from the sensors 126. In response, the card device 120 may access the baseline features 210 associated with the baseline environment data profile 144. In certain embodiments, the card device 120 may extract the baseline features 210 from the sensor data 134a in response to receiving the sensor data 134b. The card device 120 may also feed the sensor data 134b to the machine learning algorithm 142 for processing, similar to that described above. The card device 120 (e.g., via the machine learning algorithm 142) may extract the test features 212 from the sensor data 134b. The test features 212 may indicate physical attributes of the objects 204, such as shapes, colors, and locations.

The card device 120 may compare the baseline features 210 with the test features 212 to determine whether the new location corresponds to any of the known locations in the baseline environment data profile 144. In certain embodiments, the baseline features 210 may be represented by a baseline feature vector 226 comprising numerical values, and the test features 212 may be represented by test feature vector 228 comprising numerical values.

In certain embodiments, comparing the extracted baseline features 210 with the counterpart feature from among the extracted test features 212 may be in response to comparing at least one (or at least more than a threshold percentage) of the numerical values of the baseline feature vector 226 with a counterpart numerical value of the test feature vector 228.

In certain embodiments, determining that the card device 120 is in the area that deviates from the geographical location where the card device 120 is typically carried (as indicated in the baseline environment data profile 144) may be in response to determining that the at least one (or at least more than a threshold percentage, e.g., more than 50%, 60%, etc.) of the numerical values of the baseline feature vector 226 does not correspond to the counterpart numerical value in the test feature vector 228.

In certain embodiments, the card device 120 may compare each of the baseline features 210 with a counterpart test feature from among the test features 212. The card device 120 may determine that the card device 120 is in an area that deviates from the geographical locations where the user 102 typically carries the card device 120 (as indicated in the baseline environment data profile 144) if it is determined that at least a threshold percentage of the baseline features 210 (e.g., 50%, 80%, etc.) does not correspond to the counterpart test feature from among the set of test features 212.

In certain embodiments, card device 120 may determine that the card device 120 is in an area that deviates from the geographical locations where the user 102 typically carries the card device 120 (as indicated in the baseline environment data profile 144) if it is determined that at least one of the baseline features 210 does not correspond to the counterpart test feature from among the set of test features 212. For example, if it is determined that a GPS location of the card device 120 is outside of the boundary of the known locations in the baseline environment data profile 144, the card device 120 may determine that the card device 120 is in an area that deviates from the baseline environment data profile 144.

In certain embodiments, the card device 120 may determine a Euclidean distance between the baseline feature vector 226 and the test feature vector 228. The card device 120 may determine whether the Euclidean distance is less than a threshold distance (e.g., less than 0.01, 0.1, etc.). In certain embodiments, card device 120 may determine that the card device 120 is in an area that deviates from the geographical locations where the user 102 typically carries the card device 120 (as indicated in the baseline environment data profile 144) if it is determined that the determined Euclidean distance is more than the threshold distance.

In certain embodiments, determining that the card device 120 is in an area that deviates from the geographical locations where the user 102 typically carries the card device 120 may correspond to determining that the card device 120 is outside of any of the known locations indicated in the baseline environment data profile 144.

In certain embodiments, determining that the card device 120 is in an area that deviates from the geographical locations where the user 102 typically carries the card device 120 may correspond to determining that the card device 120 is outside of a geofence area representing the known location indicated in the baseline environment data profile 144.

In response to determining that the card device 120 is in the area that deviates from the known geographical locations indicated in the baseline environment data profile 144, the card device 120 may dynamically mask the user information 138. For example, the card device 120 may replace the text in the user information 138 with "x" or other characters. In another example, the user information 138 may be redacted by a block.

In certain embodiments, the card device 120 may detect that a message 216 is received at the card device 120 after it is determined that the card device 120 is in the area that deviates from the known geographical locations indicated in the baseline environment data profile 144. The message 216 may include a security token, or any other information. In response, the card device 120 may dynamically mask the received message 216.

In certain embodiments, in response to determining that the card device 120 is in the area that deviates from the baseline environment data profile 144, the card device 120 may disable the card device 120 from being used for data communication with another device. If it is determined that the card device 120 is in the area that corresponds to a known geographical location indicated in the baseline environment data profile 144, the card device 120 may allow the data communications with other devices upon authenticating the user 102, and not mask or unmask the user information 138. In certain embodiments, the user information 138 may be masked or not known and the data communications may be disabled by default, and in response to detecting that the user 102 wants to use the card device 120, the user information 138 may be displayed and the data communications may be enabled.

Adding a New Environment to the Baseline Environment Data Profile

The card device 120 may add a new location to the known locations in the baseline environment data profile 144. For example, assume that the card device 120 is carried to a new location. The sensors 126 detect a third set of objects 204 and capture sensor data 134c. The sensors 126 communicate the sensor data 134c to the processor of the card device 120. The card device 120 receives the third sensor data 134c from the sensors 126. The sensor data 134c indicate presence of the third set of objects 204. In response, the card device 120 may feed the sensor data 134c to the machine learning algorithm 142. The card device 120 (e.g., via the machine learning algorithm 142) may extract the second test features 212 from the third sensor data 134c, where the second test features indicate physical attributes of the objects 204.

The card device 120 may compare each of the baseline features 210 with the counterpart test feature from the test features 212. The card device 120 may determine whether the card device 120 is in the area that deviates from the known locations in the baseline environment data profile 144. The card device 120 may determine that the card device 120 is in the area that deviates from the known locations in the baseline environment data profile 144 if at least one (or more than a threshold percentage) of the baseline features 210 does not correspond to the counterpart test feature 212.

In certain embodiments, the card device 120 may determine a Euclidean distance between the baseline feature vector 226 and the test feature vector 228, and determine that the card device 120 is in the area that deviates from the known locations in the baseline environment data profile 144 if the Euclidean distance is less than a threshold distance, similar to that described above.

The card device 120 may display a message 214 that requests an identity of the user 102 on the display field 128. The user 102 may identify and authenticate themselves, e.g., by providing user credentials and/or biometric sample, similar to that described above. The card device 120 may receive the user input comprising the credential associated with the user 102. The card device 120 may compare the received credential with previously provide and stored credential. The card device 120 may determine if the received credential corresponds to the expected credential.

In response to determining that received credential corresponds to the expected credential, the card device 120 may generate a new environment data profile for the user 102. The new environment data profile may indicate objects 204 in the new location. The card device 120 may add the new environment data profile to the baseline environment data profile 144.

Identifying the User Based on the Pose Estimation

In certain embodiments, the card device 120 may determine whether the user 102 or another person is carrying the card device 120 or accessing the card device 120. In this process, the card device 120 may determine a first pose estimation data 220 associated with the user 102 based on processing the sensor data 134a, where the sensor data 134a may include an image of the user 102, a motion data associated with the movement of the user 102, etc. If the card device 120 is within a threshold distance 140 of another person 222, the card device 120 may receive a fourth sensor data 134d from the sensors 126, where the sensor data 134d may comprise information about the other person 222. For example, the sensor data 134d may comprise an image feed that provides information about a pose of the person 222.

The card device 120 may feed the sensor data 134a and d to the machine learning algorithm 142. The card device 120 (e.g., via the machine learning algorithm 142) may determine the pose estimation data 220 from the sensor data 134a, and determine the pose estimation data 224 associated with the person 222 from the sensor data 134d. The card device 120 may compare the pose estimation data 220 with the pose estimation data 224.

In certain embodiments, the first pose estimation data 220 may be represented by a first pose estimation vector 230 comprising numerical values, and the second pose estimation data 224 may be represented by a second pose estimation vector 232 comprising numerical values. The card device 120 may determine that the first pose estimation data 220 does not correspond to the second pose estimation data 224. In certain embodiments, determining that the first pose estimation data 220 does not correspond to the second pose estimation data 224 may be in response to comparing the first pose estimation vector 230 with the second pose estimation vector 232 and determining that more than a threshold number of numerical values in the first pose estimation vector 230 does not correspond to the counterpart numerical values of the second pose estimation vector 232. In response, the card device 120 may dynamically mask the user information 138 on the display field 128 and/or disable the data communications for the card device 120. Otherwise, the card device 120 may allow the data communications for the card device 120.

Method for Altering Card Device Attributes in Response to an Anomalous Location

FIG. 3 illustrates an example flowchart of a method 300 for altering card device 120 attributes in response to an anomalous location according to certain embodiments of the present disclosure. Modifications, additions, or omissions may be made to method 300. Method 300 may include more, fewer, or other operations. For example, operations may be performed in parallel or in any suitable order. While at times discussed as the system 100, card device 120, or components of any of thereof performing operations, any suitable system or components of the system may perform one or more operations of the method 300. For example, one or more operations of method 300 may be implemented, at least in part, in the form of software instructions 132, 158 of FIG. 1, stored on non-transitory, tangible, machine-readable media (e.g., memory 130, 156 of FIG. 1) that when run by one or more processors (e.g., processor 122, 152 of FIG. 1) may cause the one or more processors to perform operations 302-322.

At operation 302, the card device 120 receives a first sensor data 134a from at least one sensor 126, where the first sensor data 134a indicates presence of the first set of objects 202 around the card device 120. For example, the sensors 126 may capture sensor data 134a continuously, periodically, or on demand, or in response to a trigger event when the sensors 126 detect an object within their detection range.

At operation 304, the card device 120 generates the baseline environment data profile 144 based on the first sensor data 134a. For example, the card device 120 may feed the sensor data 134a to the machine learning algorithm 142 to generate the baseline environment data profile 144, similar to that described in FIG. 2.

At operation 306, the card device 120 receives a second sensor data 134b from the at least one sensor 126, where the second sensor data 134b indicates presence of a second set of objects 204 around the card device 120. For example, the sensors 126 may capture the sensor data 134b continuously, periodically, on demand, or in response to a trigger event when the sensors 126 detect an object within their detection range.

Figure 2:
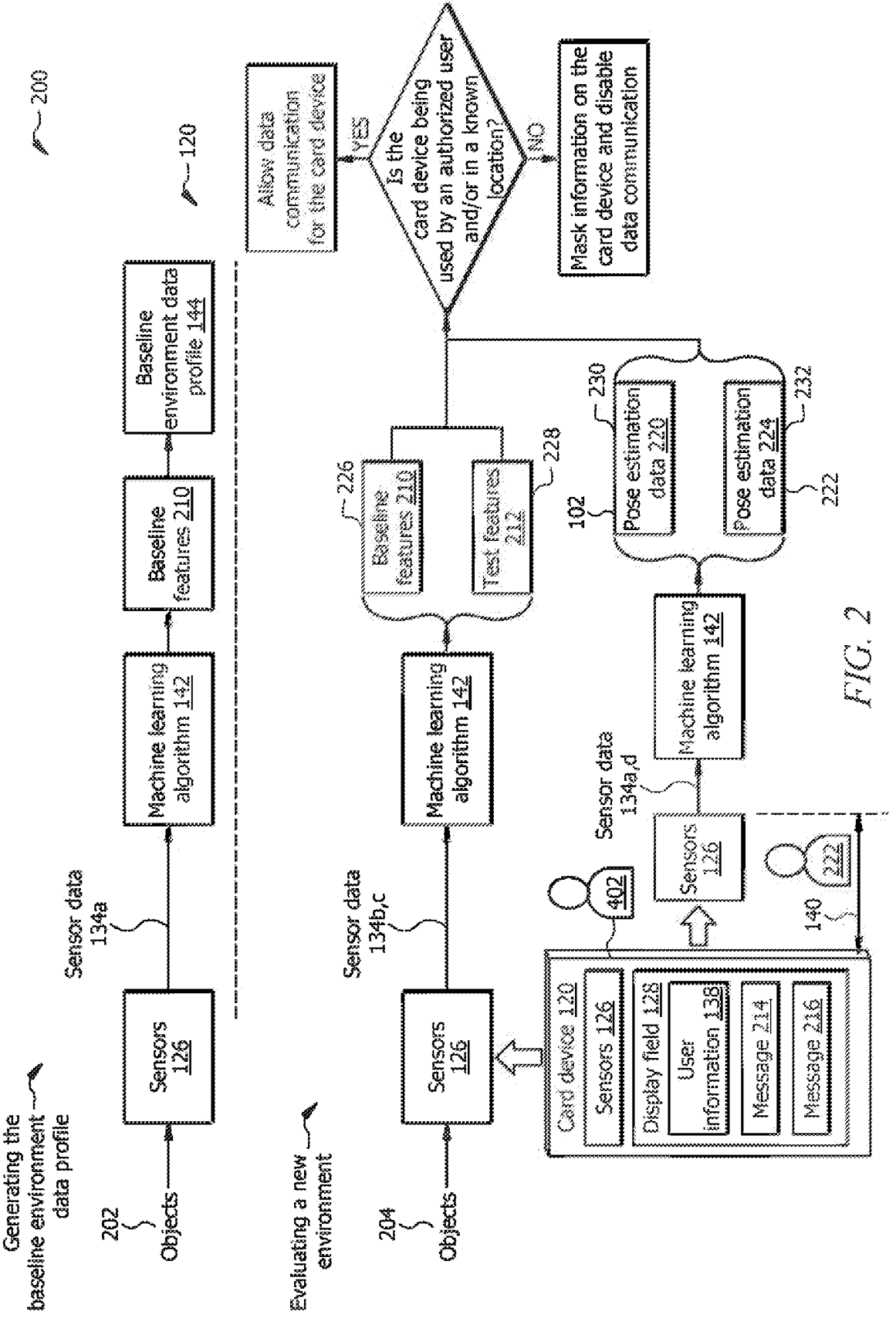
FIG. 2 illustrates an example operational flow of the system of FIG. 1 for altering card device attributes in response to an anomalous location of the card device.

At operation 308, the card device 120 extracts baseline features 210 from the first sensor data 134a, e.g., via the machine learning algorithm 142, similar to that described in FIG. 2. At operation 310, the card device 120 extracts test features 212 from the sensor data 134b, via the machine learning algorithm 142, similar to that described in FIG. 2.

At operation 312, the card device 120 compares the baseline features 210 with the test features 212. For example, the card device 120 may compare each baseline feature 210 with a counterpart test feature 212. In another example, the card device 120 may compare the baseline feature vector with the test feature vector, similar to that described in FIG. 2.

At operation 314, the card device 120 determines whether more than a threshold percentage of the baseline features 210 correspond to the counterpart test features 212. If is it determined that more than a threshold percentage (e.g., more than 80%, 90%, etc.) of the baseline features 210 correspond to the counterpart test features 212, method 300 proceeds to the operation 316. Otherwise, method 300 proceeds to operation 318.

At operation 316, the card device 120 may allow data communications for the card device 120. For example, the card device 120 may allow the card device 120 to communicate data with other devices. The card device 120 may also not mask or unmask the user information 138 displayed on the card device 120. In response, if the user 102 wants to use the card device 120 to interact with another device, the card device 120 may communicate data (e.g., user information 138) to the other device and generate the interaction session data 146. The card device 120 may communicate the interaction session data 146 to the backend server 150 and/or to the blockchain network 180 to be distributed among the notes 182*a-n*.

At operation 318, the card device 120 determines that the card device 120 is in the area that deviates from the geographical locations that are indicated in the baseline environment data profile 144.

At operation 320, the card device 120 dynamically masks the user information 138 displayed on the card device 120. For example, the card device 120 may replace text of the user information 138 to other characters, e.g., "x". In another example, the card device 120 may encrypt the user information 138 by an encryption function. The user 102 may be provided the decryption key to decrypt the encrypted user information. At operation 322, the card device 120 disables the data communication for the card device 120. In response, the card device 120 may not be able to interact with other devices.

Altering Card Device Attributes in Response to Proximity Intrusion

Figure 4:
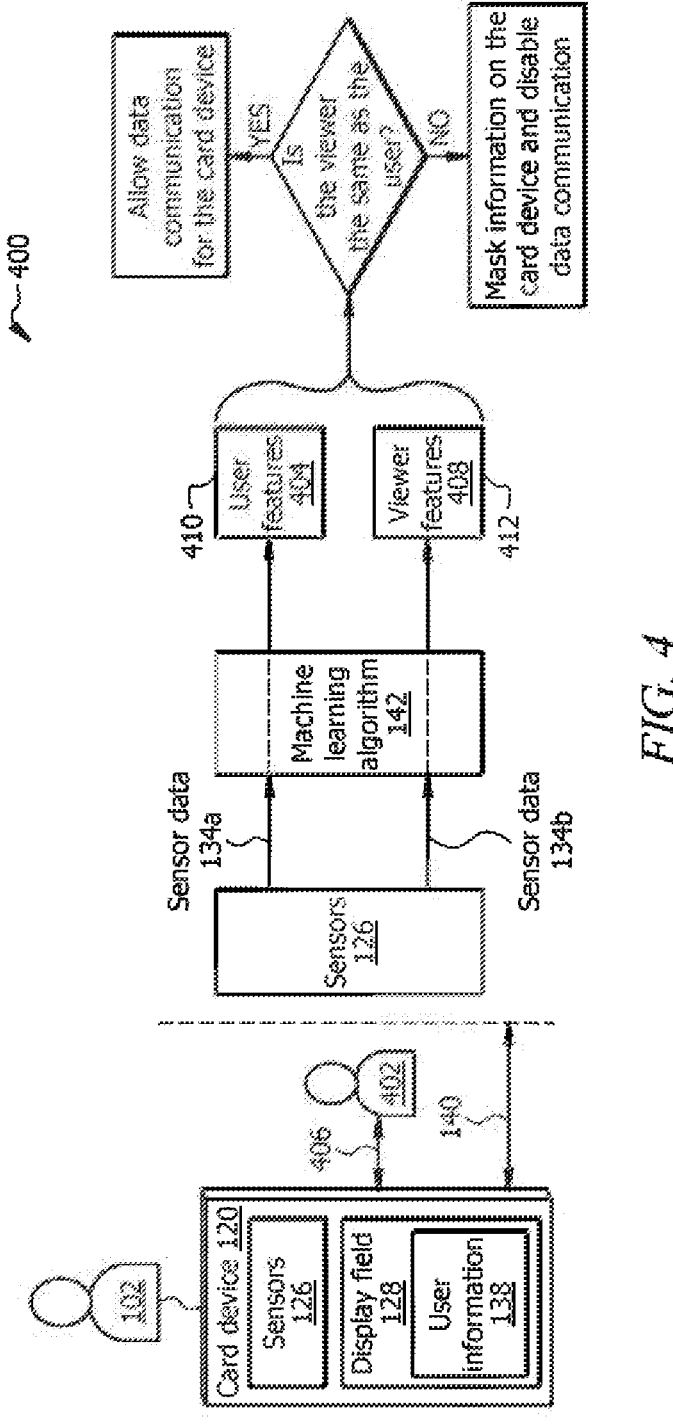
FIG. 4 illustrates an example operational flow of the system of FIG. 1 for altering card device attributes in response to a proximity intrusion.

FIG. 4 illustrates an example operational flow 400 of system 100 of FIG. 1 for altering attributes of the card device 120 in response to proximity intrusion by other (unauthorized) viewers 402 around the card device 120. In operation, the card device 120 may establish a user profile for the user 102. The user profile may include user features 404. In this process, the card device 120 may receive first sensor data 134*a* from the sensors 126. The first sensor data 134*a* may indicate presence of the first user 102 around the card device 120. For example, the first sensor data 134*a* may include an image of the user 102, an audio sample of the user 102, etc.

The card device 120 may feed the sensor data 134*a* to the machine learning algorithm 142. The card device 120 (e.g., via the machine learning algorithm 142) may extract a set of user features 404 from the first sensor data 134*a*. The set of user features 404 may indicate physical attributes of the user 102, such as height, facial features, retinal features, pose estimation, etc. In this manner, the card device 120 may identify the user 102 for authentication and verification.

Identifying an Intrusion of a Viewer

In some cases, the card device 120 may be in a crowded location, such as in a public transport vehicle, or a crowded room, etc. In such cases, other people may be able to glance at the card device 120 and view the user information 138. In some cases, the card device 120 may be accessed by a person other than the user 102, such as an unauthorized person. In such cases, the other person may be able to use the user information 138 in malicious actions, such as access personal information associated with the user 102 and/or transmit data from the card device 120 to other devices and impersonate the user 102. Thus, it is desired to identify intruding viewers and in response, prevent them from accessing the user information 138 and using the card device 120 to perform data communications.

In an example scenario, assume that the viewer 402 is detected by the sensors 126. The card device 120 may receive the second sensor data 134*b* from the sensors 126. The second sensor data 134*b* may indicate the presence of the viewer 402 around the card device 120. The card device 120 may feed the sensor data 134*b* to the machine learning algorithm 142. The card device 120 (e.g., via the machine learning algorithm 142) may extract a set of viewer features 408 from the sensor data 134*b*. The viewer features 408 may indicate physical attributes of the viewer 402, such as height, facial features, pose estimation, biometric features, etc.

The card device 120 may compare each of the user features 404 with the counterpart viewer feature 408. The card device 120 my determine whether each of the user features 404 corresponds to the counterpart viewer feature 408. In certain embodiments, if the card device 120 determines that more than a threshold percentage of the user features 404 does not correspond to the counterpart viewer feature 408, the card device 120 may determine that the viewer 402 is not the user 102.

In certain embodiments, the user features 404 may be represented by a user feature vector 410 comprising numerical values, and the viewer features 408 may be represented by a viewer feature vector 412 comprising numerical values. The card device 120 may determine a Euclidean distance between the user feature vector 410 and the viewer feature vector 412. If the Euclidean distance is more than a threshold distance (e.g., more than 0.1, 0.01, etc.), the card device 120 may determine that the viewer 402 is not the user 102.

In certain embodiments, comparing each of the extracted user features 404 with the counterpart viewer feature 408 is in response to comparing each of the numerical values in the user feature vector 410 with a counterpart numerical value from among the numerical values of the viewer feature vector 412.

In certain embodiments, determining that the user 102 is not the viewer 402 may be in response to determining that more than the threshold percentage of the numerical values of the user feature vector 410 does not correspond to the counterpart numerical values from among the numerical values of the viewer feature vector 412.

The card device 120 may determine a distance 406 between the viewer 402 and the card device 120. The card device 120 may compare the distance 406 to the threshold distance 140. The threshold distance 140 may be maximum distance from which the user information 138 on the card device 120 is identifiable. The threshold distance 140 may be determined based on the font size of the user information 138.

If the card device 120 determines that the distance 406 is less than the threshold distance 140 and that the viewer 402 is not the user 102, the card device 120 may dynamically mask the user information 138 displayed on the display field 128, similar to that described in FIG. 2. In certain embodiments, the card device 120 may also disable data communicate for the card device 120.

In certain embodiments, the card device 120 may determine whether the user 102 or another person is carrying the card device 120 or is accessing the card device 120 based on pose estimation data (220 and 224 in FIG. 2), similar to that described in FIG. 2. If the card device 120 determines that the other person 402 is accessing or carrying the card device 120, the card device 120 may dynamically mask the user information 138 on the display field 128 and/or disable data communicate for the card device 120.

Figure 5:
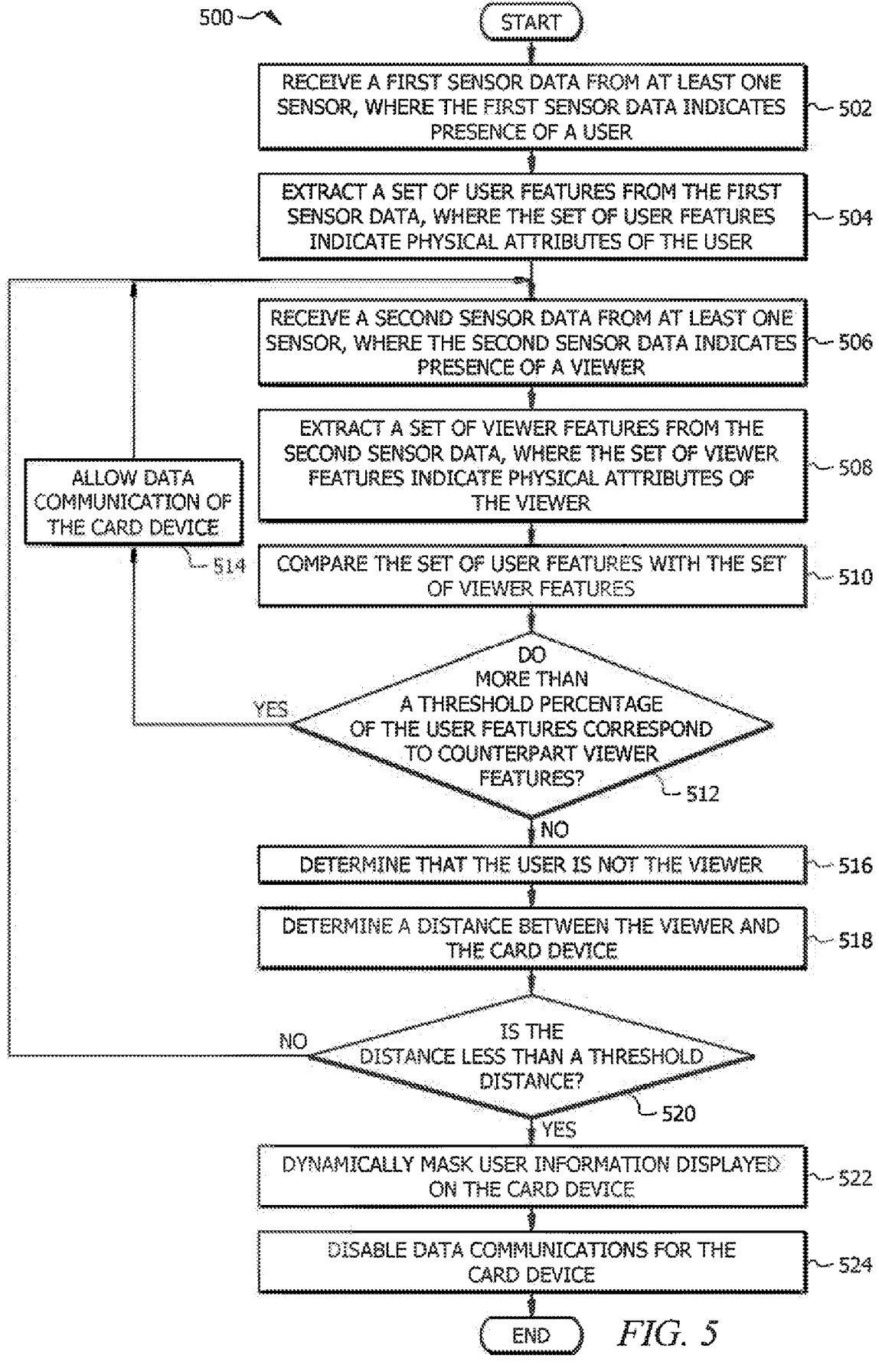
FIG. 5 illustrates an example flowchart of a method for altering card device attributes in response to a proximity intrusion.

Method for Altering Card Device Attributes in Response to Detecting a Proximity Intrusion FIG. 5 illustrates an example flowchart of a method 500 for altering card device 120 attributes in response to a proximity intrusion of a viewer according to certain embodiments of the present disclosure. Modifications, additions, or omissions may be made to method 500. Method 500 may include more, fewer, or other operations. For example, operations may be performed in parallel or in any suitable order. While at times discussed as the system 100, card device 120, or components of any of thereof performing operations, any suitable system or components of the system may perform one or more operations of the method 300. For example, one or more operations of method 300 may be implemented, at least in part, in the form of software instructions 132, 158 of FIG. 1, stored on non-transitory, tangible, machine-readable media (e.g., memory 130, 156 of FIG. 1) that when run by one or more processors (e.g., processor 122, 152 of FIG. 1) may cause the one or more processors to perform operations 502-520.

At operation 502, the card device 120 receives a first sensor data 134a from at least one sensor 126, where the first sensor data 134a indicates presence of a user 102. For example, the sensors 126 may capture sensor data 134a continuously, periodically, or on demand, or in response to a trigger event when the sensors 126 detect an object within their detection range.

At operation 504, the card device 120 extracts a set of user features 404 from the first sensor data 134a, where the set of user features 404 indicates physical attributes of the user 102. For example, the card device 120 may feed the sensor data 134a to the machine learning algorithm 142 to extract the set of user features 404.

At operation 506, the card device 120 receives a second sensor data 134b from the at least one sensor 126, where the second sensor data 134b indicates presence of a viewer 402. For example, the sensors 126 may capture the sensor data 134b continuously, periodically, on demand, or in response to a trigger event when the sensors 126 detect an object within their detection range.

At operation 508, the card device 120 extracts a set of viewer features 408 from the second sensor data 134b, where the set of viewer features 408 indicates physical attributes of the viewer 402. For example, the card device 120 may feed the sensor data 134b to the machine learning algorithm 142 to extract the set of viewer features 408.

At operation 510, the card device 120 compares the set of user features 404 with the set of viewer features 408. For example, the card device 120 (e.g., via the machine learning algorithm 142) may perform a vector comparison operation between the user feature vector 410 that represents the user features 404 and the viewer feature vector 412 that represents the viewer features 408, similar to that described in FIG. 4. In one example, the card device 120 may compare each user feature 404 with a counterpart viewer feature 408. In the same or another example, the card device 120 may determine a Euclidean distance between the user feature vector 410 and the viewer feature vector 412.

At operation 512, the card device 120 determines whether more than a threshold percentage of the user features 404 correspond to the counterpart viewer features 408. In certain embodiments, the card device 120 may determine whether the Euclidean distance between the user feature vector 410 and the viewer feature vector 412 is less than a threshold distance, similar to that described in FIG. 4. If the card device 120 determines that more than a threshold percentage of the user features 404 correspond to the counterpart viewer features 408, method 500 proceeds to operation 514. Otherwise, method 500 proceeds to operation 516.

At operation 514, the card device 120 may allow data communications for the card device 120. For example, the card device 120 may allow the card device 120 to communicate data with other devices. The card device 120 may also not mask or unmask the user information 138 displayed on the card device 120. In response, if the user 102 wants to use the card device 120 to interact with another device, the card device 120 may communicate data (e.g., user information 138) to the other device and generate the interaction session data 146. The card device 120 may communicate the interaction session data 146 to the backend server 150 and/or to the blockchain network 180 to be distributed among the notes 182a-n.

At operation 516, the card device 120 determines that the user 102 is not the viewer 402. At operation 518, the card device 120 determines the distance 406 between the viewer 402 and the card device 120. For example, the card device 120 may use a distance measuring feature in a camera sensor 126 and/or a light detection and ranging sensor 126 to detect the distance 406 between the viewer 402 and the card device 120.

At operation 520, the card device 120 determines whether the distance 406 is less than a threshold distance 140. If it is determined that the distance 406 is less than the threshold distance 140, method 500 proceeds to operation 522. Otherwise, method 500 returns to operation 506 to evaluate other people/viewers 402 around the card device 120.

At operation 522, the card device 120 dynamically masks the user information 138 displayed on the card device 120, similar to that described in FIGS. 1-4. At operation 524, the card device 120 disables the data communications for the card device 120. In response, the card device 120 may not be able to interact with other devices.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for dynamically changing attributes of a card device, comprising:

at least one sensor configured to capture sensor data, wherein the sensor data provides information about an environment around a card device, wherein the information about the environment indicates objects located within the environment around the card device;

a display field configured to display information, comprising a name or a number associated with a first user; and a processor operably coupled to the at least one sensor and the display field, and configured to:

receive a first sensor data from the at least one sensor, wherein the first sensor data indicates presence of a first set of objects around the card device;

generate a baseline environment data profile for the first user based at least in part upon the first sensor data, wherein the baseline environment data profile indicates a geographical location where the first user typically carries the card device;

receive a second sensor data from the at least one sensor, wherein the second sensor data indicates presence of a second set of objects around the card device;

in response to receiving the second sensor data:

extract baseline features from the first sensor data, wherein the baseline features provide information about the baseline environment data profile, wherein the information about the baseline environment data profile indicates physical attributes of the first set of objects and wherein the baseline features are represented by a baseline feature vector comprising a first set of numerical values;

extract test features from the second sensor data, wherein the test features indicate physical attributes of the second set of objects and wherein the test features are represented by a test feature vector comprising a second set of numerical values;

compare at least one of the extracted baseline features with a counterpart feature from among the extracted test features, in response to comparing at least one of the first set of numerical values with a counterpart numerical value from among the second set of numerical values;

determine if a Euclidean distance between the baseline feature vector and the test feature vector exceeds a threshold distance;

in response to determining that the Euclidean distance between the baseline feature vector and the test feature vector exceeds the threshold distance, determine that the card device is in an area that deviates from the geographical location where the card device is typically carried; and in response to determining that the card device is in the area that deviates from the geographical location, dynamically mask the information displayed on the display field.

2. The system of claim 1, wherein the processor is further configured to, in response to determining that the card device is in the area that deviates from the geographical location, disable the card device from being used for data communication.

3. The system of claim 1, wherein the processor is further configured to:

receive a third sensor data from the at least one sensor, wherein the third sensor data indicates presence of a third set of objects;

in response to receiving the third sensor data:

extract second test features from the third sensor data, wherein the second test features indicate physical attributes of the third set of objects;

compare at least one of the extracted baseline features with the counterpart feature from among the second extracted test features;

determine that the card device is in the area that deviates from the geographical location where the card device is typically carried in response to determining that more than a threshold percentage of the extracted baseline features does not correspond to the counterpart feature from among the extracted test features;

display a message that requests an identity of the first user on the display field;

receive user input comprising a credential associated with the first user;

determine that the received credential corresponds to an expected credential information associated with the first user; and in response to determining that the received credential corresponds to the expected credential information associated with the first user:

generate a second environment data profile for the first user; and add the second environment data profile to the baseline environment data profile.

4. The system of claim 1, wherein the processor is further configured to:

determine a first pose estimation data associated with the first user based at least in part upon the first sensor data, wherein the first sensor data comprises an image feed of the first user;

receive a fourth sensor data from the at least one sensor, wherein the fourth sensor data comprises information about a second user, wherein the information about the second user comprises a second pose estimation associated with the second user;

detect a second pose estimation data associated with the second user based at least in part upon the fourth sensor data;

compare the first pose estimation data with the second pose estimation data;

determine that the first pose estimation data does not correspond to the second pose estimation data; and in response to determining that the first pose estimation data does not correspond to the second pose estimation data, dynamically mask the information displayed on the display field.

5. The system of claim 1, wherein the at least one sensor comprises a camera, a sound sensor, a light sensor, a humidity sensor, a biometric sensor, and a pressure sensor.

6. The system of claim 1, wherein determining that the card device is in the area that deviates from the geographical location where the card device is typically carried in response to determining that more than a threshold percentage of the extracted baseline features does not correspond to the counterpart feature from among the extracted test features.

7. The system of claim 1, wherein determining that the card device is in the area that deviates from the geographical location where the card device is typically carried is in response to determining that more than a threshold percentage of the first set of numerical values does not correspond to the counterpart numerical value from among the second set of numerical values.

8. A method for dynamically changing attributes of a card device, comprising:

receiving a first sensor data from at least one sensor associated with a card device, wherein the first sensor data indicates presence of a first set of objects around the card device;

generating a baseline environment data profile for a first user based at least in part upon the first sensor data, wherein the baseline environment data profile indicates a geographical location where the first user typically carries the card device;

receiving a second sensor data from the at least one sensor, wherein the second sensor data indicates presence of a second set of objects around the card device;

in response to receiving the second sensor data:

extracting baseline features from the first sensor data, wherein the baseline features provide information about the baseline environment data profile, wherein the information about the baseline environment data profile indicates physical attributes of the first set of objects and wherein the baseline features are represented by a baseline feature vector comprising a first set of numerical values; and extracting test features from the second sensor data, wherein the test features indicate physical attributes of the second set of objects and wherein the test features are represented by a test feature vector comprising a second set of numerical values;

comparing at least one of the extracted baseline features with a counterpart feature from among the extracted test features, in response to comparing at least one of the first set of numerical values with a counterpart numerical value from among the second set of numerical values;

determining if a Euclidean distance between the baseline feature vector and the test feature vector exceeds a threshold distance;

in response to determining that the Euclidean distance between the baseline feature vector and the test feature vector exceeds the threshold distance, determining that the card device is in an area that deviates from the geographical location where the card device is typically carried; and in response to determining that the card device is in the area that deviates from the geographical location, dynamically masking information displayed on a display field.

9. The method of claim 8, further comprising, in response to determining that the card device is in the area that deviates from the geographical location, disable the card device from being used for data communication.

10. The method of claim 8, further comprising:

receiving a third sensor data from the at least one sensor, wherein the third sensor data indicates presence of a third set of objects;

in response to receiving the third sensor data:

extracting second test features from the third sensor data, wherein the second test features indicate physical attributes of the third set of objects;

comparing at least one of the extracted baseline features with the counterpart feature from among the second extracted test features;

determining that the card device is in the area that deviates from the geographical location where the card device is typically carried in response to determining that more than a threshold percentage of the extracted baseline features does not correspond to the counterpart feature from among the extracted test features;

displaying a message that requests an identity of the first user on the display field;

receive user input comprising a credential associated with the first user;

determining that the received credential corresponds to an expected credential information associated with the first user; and in response to determining that the received credential corresponds to the expected credential information associated with the first user:

generating a second environment data profile for the first user; and adding the second environment data profile to the baseline environment data profile.

11. The method of claim 8, wherein the at least one sensor comprises a camera, a sound sensor, a light sensor, a humidity sensor, a biometric sensor, or a pressure sensor.

12. The method of claim 8, further comprising:

determining a first pose estimation data associated with the first user based at least in part upon the first sensor data, wherein the first sensor data comprises an image feed of the first user;

receiving a fourth sensor data from the at least one sensor, wherein the fourth sensor data comprises information about a second user, wherein the information about the second user comprises a second pose estimation associated with the second user;

detecting a second pose estimation data associated with the second user based at least in part upon the fourth sensor data;

comparing the first pose estimation data with the second pose estimation data;

determine that the first pose estimation data does not correspond to the second pose estimation data; and in response to determining that the first pose estimation data does not correspond to the second pose estimation data, dynamically masking the information displayed on the display field.

13. The method of claim 8, further comprising:

detecting that a message is received at the card device; and dynamically masking the message in response to determining that the card device is in the area that deviates from the geographical location.

14. The method of claim 12, wherein:

the first pose estimation data is represented by a first pose estimation vector comprising a third set of numerical values;

the second pose estimation data is represented by a second pose estimation vector comprising a fourth set of numerical values;

determining that the first pose estimation data does not correspond to the second pose estimation data is in response to:

comparing the first pose estimation vector with the second pose estimation vector; and determining that more than a threshold numerical values of the third set of numerical values does not correspond to counterpart numerical values from among the fourth set of numerical values.

15. A non-transitory computer-readable medium storing instructions that when executed by a processor, cause the processor to:

receive a first sensor data from at least one sensor associated with a card device, wherein the first sensor data indicates presence of a first set of objects around the card device;

generate a baseline environment data profile for a first user based at least in part upon the first sensor data, wherein the baseline environment data profile indicates a geographical location where the first user typically carries the card device;

receive a second sensor data from the at least one sensor, wherein the second sensor data indicates presence of a second set of objects around the card device;

in response to receiving the second sensor data:

extract baseline features from the first sensor data, wherein the baseline features provide information about the baseline environment data profile, wherein the information about the baseline environment data profile indicates physical attributes of the first set of objects and wherein the baseline features are represented by a baseline feature vector comprising a first set of numerical values; and extract test features from the second sensor data, wherein the test features indicate physical attributes of the second set of objects and wherein the test features are represented by a test feature vector comprising a second set of numerical values;

compare at least one of the extracted baseline features with a counterpart feature from among the extracted test features, in response to comparing at least one of the first set of numerical values with a counterpart numerical value from among the second set of numerical values;

determine if a Euclidean distance between the baseline feature vector and the test feature vector exceeds a threshold distance;

in response to determining that the Euclidean distance between the baseline feature vector and the test feature vector exceeds the threshold distance, determine that the card device is in an area that deviates from the geographical location where the card device is typically carried; and in response to determining that the card device is in the area that deviates from the geographical location, dynamically mask information displayed on a display field.

16. The non-transitory computer-readable medium of claim 15, wherein the instructions further cause the processor to, in response to determining that the card device is in the area that deviates from the geographical location, disable the card device from being used for data communication.

17. The non-transitory computer-readable medium of claim 15, wherein the instructions further cause the processor to:

receive a third sensor data from the at least one sensor, wherein the third sensor data indicates presence of a third set of objects; and in response to receiving the third sensor data:

extract second test features from the third sensor data, wherein the second test features indicate physical attributes of the third set of objects;

compare at least one of the extracted baseline features with the counterpart feature from among the second extracted test features;

determine that the card device is in the area that deviates from the geographical location where the card device is typically carried in response to determining that more than a threshold percentage of the extracted baseline features does not correspond to the counterpart feature from among the extracted test features;

display a message that requests an identity of the first user on the display field;

receive user input comprising a credential associated with the first user;

determine that the received credential corresponds to an expected credential information associated with the first user; and in response to determining that the received credential corresponds to the expected credential information associated with the first user:

generate a second environment data profile for the first user; and add the second environment data profile to the baseline environment data profile.

18. The non-transitory computer-readable medium of claim 15, wherein the instructions further cause the processor to:

determine a first pose estimation data associated with the first user based at least in part upon the first sensor data, wherein the first sensor data comprises an image feed of the first user;

receive a fourth sensor data from the at least one sensor, wherein the fourth sensor data comprises information about a second user, wherein the information about the second user comprises a second pose estimation associated with the second user;

detect second pose estimation data associated with the second user based at least in part upon the fourth sensor data;

compare the first pose estimation data with the second pose estimation data;

determine that the first pose estimation data does not correspond to the second pose estimation data; and in response to determining that the first pose estimation data does not correspond to the second pose estimation data, dynamically mask the information displayed on the display field.

19. The non-transitory computer-readable medium of claim 15, wherein the at least one sensor comprises a camera, a sound sensor, a light sensor, a humidity sensor, a biometric sensor, or a pressure sensor.

20. The non-transitory computer-readable medium of claim 15, wherein determining that the card device is in the area that deviates from the geographical location where the card device is typically carried in response to determining that more than a threshold percentage of the extracted baseline features does not correspond to the counterpart feature from among the extracted test features.

* * * * *